United States Patent [19]

Wilson

[11] 4,449,062
[45] May 15, 1984

[54] SAFETY ARRANGEMENT FOR A POWERED TOOL OR IMPLEMENT

[75] Inventor: Peter H. Wilson, Stockton-on-Tees, England

[73] Assignee: Black & Decker Inc., Newark, Del.

[21] Appl. No.: 302,699

[22] Filed: Sep. 15, 1981

[30] Foreign Application Priority Data

Sep. 15, 1980 [GB] United Kingdom ................ 8029763

[51] Int. Cl.³ ....................... H02H 5/08; A01H 69/02
[52] U.S. Cl. .................................... 307/328; 56/10.5; 200/83 Z
[58] Field of Search ............... 307/328, 118, 119, 326, 307/141, 141.4, 141.8; 56/10.5, 11.3, 11.6; 200/83 Z, 333; 83/788

[56] References Cited

U.S. PATENT DOCUMENTS

| | | | |
|---|---|---|---|
| 2,366,014 | 12/1944 | Finlayson . | |
| 3,268,673 | 8/1966 | Bileh | 200/83 X |
| 3,459,954 | 8/1969 | Sgocbani | 200/83 Z |
| 3,746,938 | 7/1973 | Lamb | 307/328 |
| 3,811,284 | 5/1974 | Trussell et al. . | |
| 4,003,190 | 1/1977 | Braun et al. | 56/10.5 |
| 4,105,899 | 8/1978 | Velosa | 307/326 |
| 4,161,639 | 7/1979 | Nofel . | |
| 4,205,236 | 5/1980 | Goof | 307/118 |
| 4,209,678 | 6/1980 | Hussey | 200/83 Z X |
| 4,243,970 | 1/1981 | Hardee et al. | 307/141 |
| 4,266,221 | 5/1981 | Hawkins | 307/141.4 X |

FOREIGN PATENT DOCUMENTS

| | | |
|---|---|---|
| 1295914 | 5/1969 | Fed. Rep. of Germany . |
| 1507021 | 10/1969 | Fed. Rep. of Germany . |
| 2626201 | 12/1977 | Fed. Rep. of Germany . |
| 2839002 | 3/1980 | Fed. Rep. of Germany . |
| 1538909 | 9/1968 | France . |
| 2022434 | 7/1970 | France . |
| 2348644 | 11/1977 | France . |
| 373518 | 1/1964 | Switzerland . |

Primary Examiner—E. A. Goldberg
Assistant Examiner—Todd E. DeBoer
Attorney, Agent, or Firm—Edward D. Murphy; Harold Weinstein; Ronald B. Sherer

[57] ABSTRACT

A hand-held power tool or a hand controlled implement having a primary control system by which a user controls operation of the tool or implement also has a secondary control system of pneumatic form. Operation of both systems must take place before the tool or implement is energized. A tool with primary and secondary handles has an actuator for the primary system on the primary handle and an actuator for the secondary system on the secondary handle. An implement with a single handle has the actuators mounted at different locations on the single handle that are spaced apart by a distance preventing operation thereof by the same hand of a user.

14 Claims, 3 Drawing Figures

SAFETY ARRANGEMENT FOR A POWERED TOOL OR IMPLEMENT

FIELD OF THE INVENTION

This invention relates to safety arrangements for powered tools and implements. The term "powered tools and implements" covers hand-held power tools, for example hedge trimmers, chain saws and angle grinders and the like, as well as implements which are not hand-held but whose operation is controlled by the hands of a user. Such implements include lawn mowers, scarifiers and cultivators.

BACKGROUND OF THE INVENTION

Hedge trimmers, chain saws and angle grinders are usually provided with two handles to enable the user to control the tool more easily. However, the user will sometimes hold and operate the tool with one hand only and thereby expose himself to the risk of injury either to the hand not holding the tool or to another part of his body because he has insufficient control over the tool.

To minimise the risk of injury some tools, for example electrically-powered hedge trimmers are fitted with two series-connected control switches both of which have to be actuated before the tool is energised. In a hedge trimmer, one switch is built into the main handle of the trimmer and is usually in the form of a trigger-operated switch and will be referred to as a primary switch. Another switch to be referred to as a secondary switch is connected in series with the primary switch and is associated with the other handle of the hedge trimmer in such manner that the secondary switch can be operated only when the user grasps the other handle. Thus, the hedge trimmer will be energised only when both switches are operated and this occurs only when the user grasps the main handle with one hand and the secondary handle with his other hand. Removal of either hand from the respective handle will release the appropriate switch and the tool is de-energized.

It is known to place the secondary switch directly in the other handle and to link the switch to a movable part of the handle that is actuated when a user grasps the handle. In another known arrangement, the secondary switch is mounted in the body of the trimmer and a lever associated with the other handle is linked to the secondary switch. When the user grasps the handle, he actuates the lever which, in turn, operates the secondary switch via the linkage.

Mounting the switch directly in the other handle exposes the user to the risk of electrical shock and is therefore undesirable from the point of view of safety.

However, if the switch is mounted in the body of the trimmer, the risk to the user of electrical shock is small but interconnecting linkage between the switch and the lever has to be provided and accommodated and this increases both the cost and the weight of the tool.

Both known arrangements are also inherently unsatisfactory because there is the possibility that the movable parts required to operate the secondary switch may jam with the switch operated, in which case the tool will not be de-energised when the user removes his hand from the other handle. Such movable parts also require return springs which the user has to overcome to actuate the secondary switch and this gives rise to user fatigue.

SUMMARY OF THE INVENTION

According to the present invention there is provided a hand-held power tool or a hand controlled implement having a primary control system by which a user controls operation of the tool or implement and also having a secondary control system of pneumatic form. Operation of both systems must take place before the tool or implement is energised. A tool with primary and secondary handles has an actuator for the primary system on the primary handle and an actuator for the secondary system on the secondary handle. An implement with a single handle has the actuators mounted at different locations on the single handle that are spaced apart by a distance preventing operation thereof by the same hand of a user.

BRIEF DESCRIPTION OF THE DRAWINGS

By way of example only, embodiments of the invention will now be described in greater detail with reference to the accompanying drawings of which.

DETAILED DESCRIPTION OF THE PREFERRED EMBODIMENTS

Figure 1:
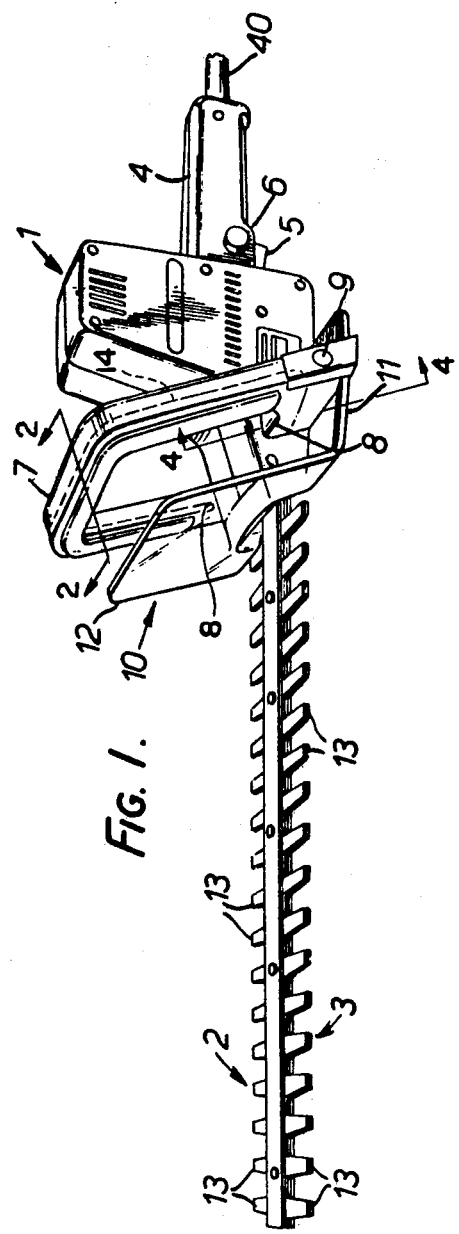
FIG. 1 is a perspective view of a hedge trimmer embodying the invention.

FIG. 1 shows a hedge trimmer in perspective view. The trimmer includes a body 1 housing an electric motor and a drive mechanism for cutter members 2, 3 that extend forwardly from the body 1. Extending rearwardly from the body 1 is a main handle 4 with a trigger 5 for operating an electric switch housed within the main handle. A releasable "lock-off" button 6 projects sideways from the handle. Button 6 must be depressed before actuation of the trigger 5.

Fixed to the forward side of the body 1 is a secondary handle 7 of inverted U-shaped form. The vertical limbs of the U are inturned as at 8 to contact the side walls of the body 1. The handle 7 is secured to the body 1 by screws one of which is shown at 9 and which pass through the inturned portions 8 and into the body 1. A forward guard 10 with a horizontal part 11 secured to the underside of the body 1 has a vertical part 12 interposed between the secondary handle 7 and the adjacent end of the cutter members 2, 3.

The cutter members 2, 3 are arranged one above the other, the lower member 3 being fixed in the body 1 while the upper member 2 extends into the body and is connected to a mechanism which converts the rotary motion of the rotor of the electric driving motor to a reciprocatory motion for reciprocating the upper member 2 relatively to the lower member 3. Both members 2, 3 have laterally extending teeth 13 and they operate in the conventional manner to cut hedges, trim bushes and the like. It is, of course, possible to drive both cutter members.

The secondary handle 7 is of channel form over most of its length, the channel accommodating an elongate, flexible-walled air sac 14 closed at one end and joined at the other end to a length of connector tube described in more detail below. The air sac 14 is indicated in FIG. 1 by the dotted line 14 and as can be seen from that Figure the tube is co-extensive with the U-shaped part of the secondary handle 7.

Figure 2:
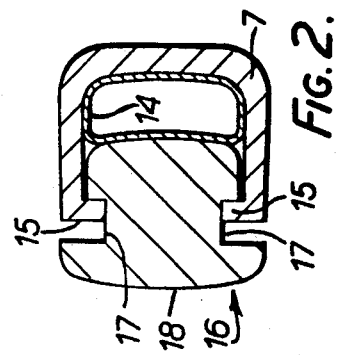
FIG. 2 is a section on the line 2—2 of FIG. 1 on an enlarged scale.

The channel in the handle 7 has inturned lips 15 which retain an actuator member 16 also of generally U-shaped form as can be seen from FIG. 1 and having grooves 17 in its side walls which coact with the lips 15 to retain the actuator member in the channel in handle 7. The outer face 18 of the actuator member is gently rounded as indicated in FIG. 2 to form a head, the body of the actuator being movable into the channel in the handle as will be described below.

Figure 3:
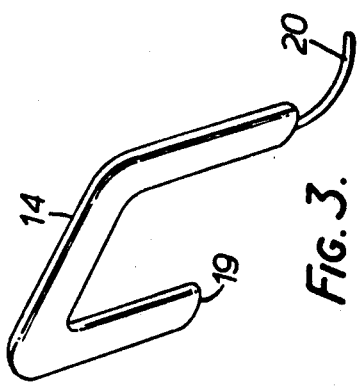
FIG. 3 is a perspective view of a part of an actuator.

The air sac 14 is shown in more detail in FIG. 3 and, as has been described above, the sac is closed at one end as at 19 and connected at the other to a connector tube 20 which is housed in one of the inturned portions 8 of the handle 7.

Figure 4:
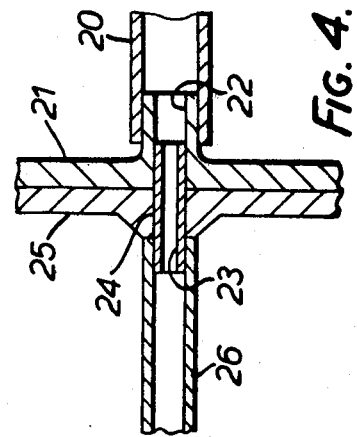
FIG. 4 is a cross-section of a detail taken on the line 4—4 of FIG. 1.

The end wall 21 (FIG. 4) of the inturned part 8 housing the connector tube 20 is formed with a nozzle 22 over which the end of the connector tube 20 fits as can be seen in FIG. 4. Extending into the bore of the nozzle 22 is a hollow pin 23 that is a force fit in an aperture 24 in the wall 25 of the body 1. The pin 23 extends into the body 1 and is connected to a pneumatically-operated electric switch—the secondary switch—located inside the body 1 via a connecting tube 26.

Figure 5:
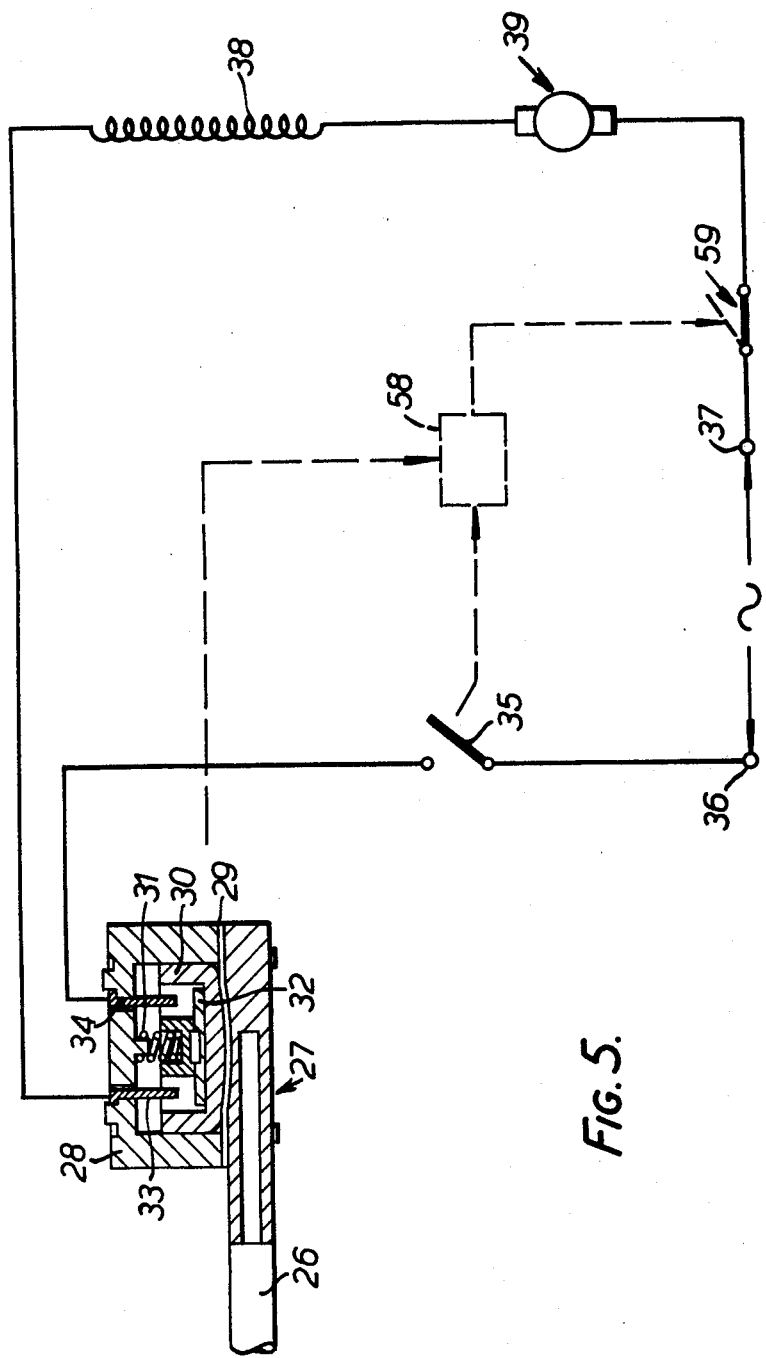
FIG. 5 is an explanatory diagram.

A typical pneumatically-operated switch is shown in FIG. 5. Clamped between a base plate 27 and an inverted cup-shaped housing 28 is a flexible diaphragm 29 that supports a cup 30 movable within the housing 28 against the action of a helical spring 31. Fixed to the base of the cup 30 is a shorting bar 32 which, with fixed contacts 33, 34 forms the secondary switch referred to above. The contacts 33, 34 are mounted in but insulated from the housing 28.

As can be seen from FIG. 5, the fixed contacts 33, 34 are in series electrical connection with a primary switch 35 actuated by the trigger 5, supply terminals 36, 37, the field winding 38 and the brushes and commutator 39 of the electric motor housed within the body 1.

The input terminals 36, 37 are connected to the conductors of a supply cable 40 that extends from the main handle 4 as can be seen from FIG. 1.

To operate the hedge trimmer, a user grasps the main handle 4 in one hand and the secondary handle 7 in the other. The trigger 5 is actuated so closing switch 35, the "lock-off" button 6 having been depressed to allow the trigger 5 to be actuated. In addition, the actuator member 16 is depressed thereby compressing part at least of the air sac 14 and increasing the air pressure therein to a value such that the diaphragm 29 is flexed upwardly so moving cup 30 upwardly (as seen in FIG. 5) causing the shorting bar 32 to bridge the fixed contacts 33, 34 and thereby complete the energising circuit of the driving motor.

If, during use of the hedge trimmer, the user removes either hand from the tool, the motor will be de-energised because either the primary switch 35 will open or the secondary switch will open.

The air sac 14 and the connecting tubes 20 and 26 are made of an electrically-insulating material, for example a plastics or rubber material and thereby isolate the user from the secondary switch. Only a light spring loading of the diaphragm is required thereby requiring only a little pressure to compress the air sac 14 to operate the secondary switch and in this manner user fatigue is prevented.

Moreover, because the secondary switch is operated pneumatically and the connecting tubes are flexible, the switch can readily be located in a position where it can easily be protected against ingress of moisture. In the present case, the secondary switch is located in the body 1 which is "splash-proofed" or protected against the ingress of moisture.

The pneumatic system is also of the "fail-safe" type because if a leak develops in the air sac or elsewhere in the pneumatic circuit, the secondary switch cannot be operated.

Furthermore, because of the elongate form of the air sac and because it extends round the greater part of the handle, the user will always operate the secondary switch irrespective of the exact point at which he grasps the handle.

Figure 6:
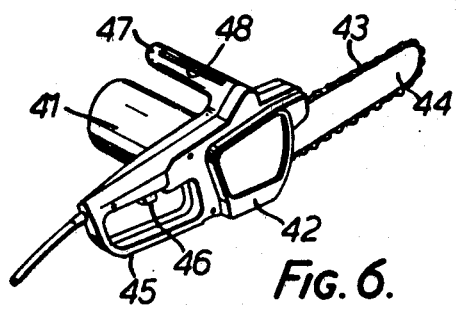
FIG. 6 is a perspective view of a chain saw embodying the invention.

FIG. 6 is a perspective view of a chain saw embodying the invention. Except as described below, the chain saw is of conventional form having a housing 41 accommodating an electric driving motor whose output shaft drives, via gearing contained in a gear case 42 joined to the housing 41, a cutter chain 43 supported in conventional manner on a cutter bar 44. Extending rearwardly from the gear case 42 is a main handle 45 with a trigger 46 that actuates a primary switch (not shown) housed in the handle 45.

Projecting from the gear case 42 is a secondary handle 47 in whose upper surface is located an actuator member 48 of similar design to actuator member 16 described above. Member 58 is located in a channel in the handle 47 and the channel also houses an elongate air sac (not shown) joined by a connecting tube (not shown) to a diaphragm-operated switch (not shown) similar to that described above with reference to FIG. 5 and located in the motor housing 41. The diaphragm operated switch is the secondary switch and is series connected with the primary switch actuated by trigger 46.

The operation of the components just described is similar to that of the corresponding components of the hedge trimmer described above. A user must actuate the trigger 46 and the actuator member 48 before the driving motor can be energised. Release of either trigger or actuator member results in de-energisation of the motor.

The actuator member 48 is, as can be seen from FIG. 6, co-extensive with the handle 47 and is, therefore, operated by the user regardless of the precise position of the user's hand on the handle.

Figure 7:
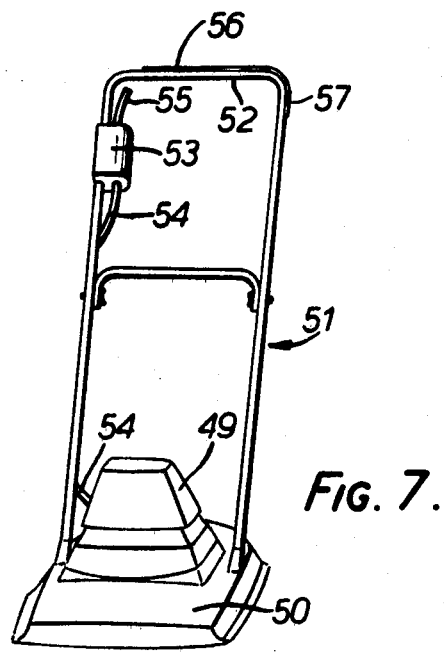
FIG. 7 is a perspective view of a lawn mower embodying the invention.

FIG. 7 is a perspective view of a lawn mower embodying the invention. The mower shown is of the air cushion supported type but it could be a cylinder mower or a rotary mower.

Housing 49 accommodates the mower driving motor and is mounted upon a cutter cover 50 that accommodates the impeller and cutter bar of the mower, these latter components being driven by the motor.

Extending from the cover 50 is a handle 51 by which a user guides the mower over a grassed surface. Mounted on the handle 51 adjacent a horizontal portion 52 thereto is a housing 53 incorporating an electric switch—the primary switch—that controls the application of electric power to the motor via a connecting cable 54. The primary switch is operated by a lever 55.

Mounted in the horizontal portion 52 is an actuator member 56 similar to member 16 described above. The end of member 56 is spaced from the lever 55 by a distance sufficient to prevent a user operating both the lever 55 and the actuator member 56 by the same hand. If desired, the actuating member 56 may extend for a short distance down the vertical limb of the handle as indicated at 57.

Accommodated beneath the actuator member 56 in a groove in the portion 52 is an elongate resilient air sac similar to sac 14 described above. The air sac is joined by a connector tube located within the handle to a secondary switch located in the housing 53 and in series connection with the primary switch with that housing.

It will be appreciated that a user must employ both hands to operate the lever 55 and the actuator member 57 and that removal of either hand will result in de-energisation of the motor driving the mower. Again, the position of the hand operating the actuator member 57 is not limited to a precise position.

If desired, the safety arrangement according to the invention may be supplemented by a unit for controlling the flow of energy to the motor only if both switches are operated within a particular time, for example within fifteen seconds. The unit may be an electronic circuit incorporating a type 555 timer actuated when either the primary or secondary switch is closed and de-actuated when the secondary or primary switch is closed. Unless de-activated, the time will "time-out" after fifteen seconds and open the motor energising circuit. The unit is energised from the supply terminals and is shown schematically in dotted lines in FIG. 5.

The circuit incorporating the 555 timer is shown as rectangle 58 with inputs from primary switch 35 and the secondary switch and an output controlling the operation of a switch 59.

In operation, a user may actuate the primary switch 35 before he compresses the air sac, or he may carry out both operations substantially simultaneously, or he may compress the air sac before he actuates the primary switch.

In the first and third cases, the timer is actuated when the first component is operated and de-activated when the second component is actuated provided the latter takes place within the fifteen seconds. In the second case, the timer is not activated.

If the timer is de-activated within the fifteen seconds or is not activated, a control signal is sent out at the expiry of the fifteen seconds which results in closure of switch 59 and energisation of the motor.

If both components are not activated within the fifteen seconds, switch 59 remains open.

I claim:

1. A powered tool or implement, comprising:
    a body;
    an electric driving motor mounted in said body;
    a primary control system including a primary electric switch controlling energisation of said motor;
    means for actuating said primary switch, said means being manually operable by one hand of an operator, and said motor only being energised while said means is being so manually operated;
    a secondary control system for said motor and which must be actuated for said motor to be energised;
    a handle connected to said body and having at least an elongate portion to be gripped by the other hand of the operator, said elongate portion having an elongate channel therein;
    said secondary control system comprising an elongate, deformable, fluid container disposed in and along said elongate channel, and a secondary electric switch actuated by deformation of said fluid container and located in said body, said fluid container being made of electrically-insulating material;
    an elongate actuating member partly engaged in said channel and partly protruding from said channel beyond the surface of said elongate portion of said handle, said fluid container being disposed below said actuating member and covered thereby, said actuating member being depressable into said channel to deform said fluid container by the gripping of said elongate portion by said other hand of the operator, whereby release of the operator's grip on said elongate portion of said handle de-energises said motor;
    said primary switch actuating means and said actuating member being spaced apart a distance sufficient to prevent the operator actuating both with the same hand; and
    a delay means comprising a time delay device operatively connected to both the primary and secondary control systems so as to be set into operation when either the primary switch is operated or the container is deformed and to be rendered inoperative in the event that deformation of the container or actuation of the primary switch follows within the predetermined time.

2. The powered tool or implement of claim 1 further comprising a second handle, said primary switch actuating means being disposed on said second handle.

3. The powered tool or implement of claim 2, wherein said primary switch actuating means comprises a trigger.

4. The powered tool or implement of claim 1, wherein said handle is of inverted U-shape and disposed forwardly of said body, and said primary switch actuating means is disposed on a second handle extending rearwardly from said body.

5. The powered tool or implement of claim 4, wherein said channel extends in an inverted U-shaped path around said inverted U-shaped handle, and said fluid container and said actuating member are both of inverted U-shape and co-extensive with said handle.

6. A powered tool or implement, comprising:
    a body;
    an electric driving motor mounted in said body;
    a primary control system including a primary electric switch controlling energisation of said motor;
    means for actuating said primary switch, said means being manually operable by one hand of an operator, and said motor only being energised while said means is being so manually operated;
    a secondary control system for said motor and which must be actuated for said motor to be energised;
    a handle connected to said body and having at least an elongate portion to be gripped by the other hand of the operator, said elongate portion having an elongate channel therein;
    said secondary control system comprising an elongate, deformable, fluid container disposed in and along said elongate channel, and a secondary electric switch actuated by deformation of said fluid container and located in said body, said fluid container being made of electrically-insulating material;
    an elongate actuating member partly engaged in said channel and partly protruding from said channel beyond the surface of said elongate portion of said handle, said fluid container being disposed below said actuating member and covered thereby, said actuating member being depressable into said channel to deform said fluid container by the gripping of said elongate portion by said other hand of the operator, whereby release of the operator's grip on said elongate portion of said handle de-energises said motor;

said primary switch actuating means and said actuating member being spaced apart a distance sufficient to prevent the operator actuating both with the same hand; and said channel having inturned lips which retain said actuating member.

7. The powered tool or implement of claim 6, wherein said actuating member has opposed longitudinal side walls having longitudinal grooves therein, said lips engaging in said grooves.

8. The powered tool or implement of claim 6, wherein said elongate portion depends laterally from said body, and said elongate container and said actuating member extend co-extensively along the upper side of said elongate portion.

9. A hand-held power tool, comprising:

a housing;

an electric drive motor housed in said housing;

a main handle connected to said housing;

a main switch for controlling energisation of said motor, said main switch having a trigger for operation thereof mounted on said main handle;

a secondary handle connected to said housing, said secondary handle having an elongate channel therein;

a secondary control system of pneumatic form which must be actuated before said motor can be energised;

said secondary control system comprising an elongate flexible-walled air sac and a secondary switch responsive to deformation of said air sac, said air sac being disposed in said channel;

said secondary switch being located in said housing and said air sac being made of electrically-insulating material;

an elongate actuating member engaged in said channel and disposed over said air sac, said actuating member partly protruding from said channel and being manually depressable into said channel to deform said air sac and increase the pressure therein to actuate said secondary switch; and said channel having inturned lips which retain said actuating member in said channel;

whereby to energise said motor an operator must hold said main handle and actuate said trigger with one hand, and grasp the secondary handle and depress said actuating member with the other hand, release of either said trigger or said actuating member effecting deenergisation of said motor.

10. The hand-held power tool of claim 9, comprising tool means extending forwardly of said housing and connected to said motor to be driven thereby; and wherein said main handle depends rearwardly from said housing, and said secondary handle extends transversely to said main handle.

11. The hand-held power tool of claim 10, wherein said secondary handle is disposed forwardly of said housing and is of inverted U-shape, said actuating member and air sac also being of inverted U-shape and extending around said inverted U-shape secondary handle.

12. The hand-held power tool of claim 11, wherein said power tool is a hedge trimmer.

13. The hand-held power tool of claim 10, wherein said power tool is a chain saw.

14. A hand-held power tool, comprising:

a housing;

an electric drive motor housed in said housing;

a main handle connected to said housing;

a main switch for controlling energisation of said motor, said main switch having a trigger for operation thereof mounted on said main handle;

a secondary handle connected to said housing, said secondary handle having a channel therein;

a secondary control system of pneumatic form which must be actuated before said motor can be energised;

said secondary control system comprising a flexible-walled air sac and a secondary switch responsive to deformation of said air sac, said air sac being disposed in said channel;

said secondary switch being located in said housing and said air sac being made of electrically-insulating material;

an actuating member engaged in said channel and disposed over said air sac, said actuating member being manually depressable into said channel to deform said air sac and increase the pressure therein to actuate said secondary switch;

whereby to energise said motor an operator must hold said main handle and actuate said trigger with one hand, and grasp the secondary handle and depress said actuating member with the other hand, release of either said trigger or said actuating member effecting deenergisation of said motor;

a timer connected to receive inputs from said main switch and said secondary switch;

a third switch which must be actuated before said motor can be energized, said third switch being actuated by an output signal from said timer; and said timer only sending out said output signal a predetermined time after either of said main or secondary switches is actuated and only if the other of said main or secondary switches is also actuated within said predetermined time.

* * * * *